United States Patent [19]

West

[11] 3,911,984
[45] Oct. 14, 1975

[54] SNOW TIRE

[76] Inventor: Allen D. West, P.O. Drawer 310, Catoosa, Okla. 74015

[22] Filed: June 27, 1974

[21] Appl. No.: 483,558

[52] U.S. Cl. .............................. 152/208; 152/210
[51] Int. Cl.² ..................................... B60C 11/14
[58] Field of Search ........... 152/167, 168, 169, 198, 152/199, 208, 210, 212, 224, 227

[56] References Cited
UNITED STATES PATENTS

| | | | |
|---|---|---|---|
| 2,480,548 | 8/1949 | Carhart | 152/208 |
| 2,841,199 | 7/1958 | Voelmel et al. | 152/208 |

*Primary Examiner*—Robert B. Reeves
*Assistant Examiner*—Larry H. Martin

[57] ABSTRACT

A snow tire having radially spaced steel gripping teeth means which are exposed to contact with the icy surface when said tire is partially deflated and are recessed within the tire tread by fully inflating the tire. The tire is provided with a plurality of U-shaped steel loops which are radially spaced around the tire. The base of the loops are provided with a plurality of teeth members around the outer surface thereof, said base with teeth members being disposed within slots or recesses provided across the tread portion of the tire. By partially deflating the tire, the tread portion is retracted thereby allowing the teeth portion of the steel loops to contact the road or snow surface providing increased traction on said icy surfaces.

3 Claims, 5 Drawing Figures

SNOW TIRE

BACKGROUND OF THE INVENTION

1. Field of the Invention

The present invention relates to snow tires and more particularly, but not by way of limitation, to a snow tire which is provided with a plurality of steel teeth members which contact the road surface when the tire is partially deflated and are recessed within the tread portion of the tire when the said tire is fully inflated.

2. Description of the Prior Art

Most snow tires are provided with heavy studded tread patterns which are usually effective in snow but are ineffective during icy conditions since the treads will not penetrate the icy surface. These snow tires also have the disadvantages of providing a rough ride on clear roads.

Formerly, the answer to providing sufficient traction on icy roads has been the use of chains which are attached to the drive wheels of the vehicle and which will bite into the surface of the ice and thereby provide sufficient traction. However, again the chains are completely unsuitable for driving on clear road surfaces and often result in damage not only to the tire to which it is attached but also to highway driving surfaces.

SUMMARY OF THE INVENTION

The present invention provides a snow tire which is particularly designed and constructed to overcome the above disadvantages. The present invention generally comprises a tire having ordinary tread patterns but provided with a plurality of radially spaced slots around the outer periphery thereof. The slots are elongated and are transversely disposed with respect to the track of the tire.

A plurality of substantially U-shaped steel loops are provided in the tire body, the base member of the said U-shaped loops being disposed in the aforementioned slots. The outer surface of each of the base members is provided with a plurality of teeth. The leg members of the U-shaped loop extend through the tire surface to the interior thereof and the tire is vulcanized or otherwise attached to the said leg members adjacent to the base member in such a way as to provide an airtight seal therebetween.

The inner ends of the said leg members may be molded into the bead portion of the tire that rests in the wheel rim or may be otherwise fastened therein.

When driving on clear pavement, the tires are fully inflated and the teeth of the steel loops are recessed within the slots. This provides a smooth ride on rubber tread. During snow or icy conditions, the tire is partially deflated thereby allowing the tread to recede or be retracted from the steel loop which in turn exposes the teeth of said loop into contact with the icy surface. The teeth then cut into the ice surface or snow and provide traction which has been found to be superior to that provided by chains, without any damage to the tire. When the roads are clear again, the tire may be fully inflated for normal roadway use.

DESCRIPTION OF THE DRAWINGS

Other and further advantageous features of the present invention will hereinafter more fully appear in connection with a detailed description of the drawings in which.

DESCRIPTION OF THE PREFERRED EMBODIMENT

Figure 1:
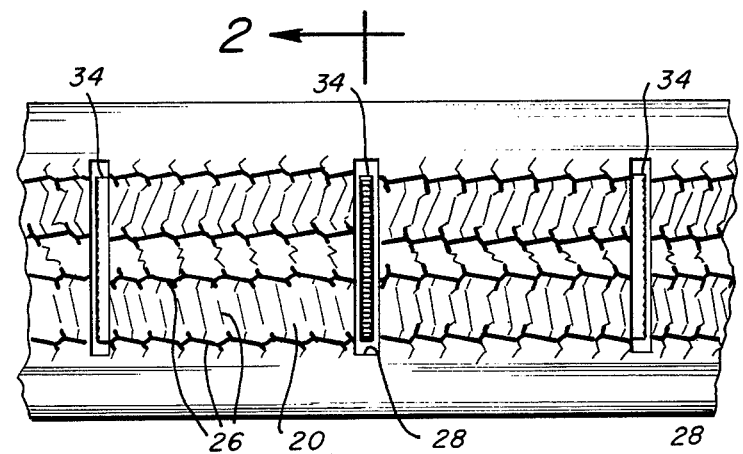
FIG. 1 is a partial plan view of a snow tire embodying the present invention.

Referring to the drawings in detail, reference character 10 generally indicates a snow tire which is mounted in an ordinary fashion on a wheel rim 12. The snow tire 10 comprises an ordinary tire casing 14 having oppositely disposed sidewalls 16 and 18 and an outwardly extending tread portion 20. The casing 14 may be provided with suitable nylon, rayon or steel cords which are not shown here for purposes of simplicity. A pair of annular shaped oppositely disposed bead members 22 and 24 are provided around the inner edge of the casing 14 in a typical manner for contacting the sidewall edges of the wheel rim 12. The tread portion 20 may be provided with ordinary tread designs generally shown by reference character 26.

The tread portion 20 of the tire 10 is provided with a plurality of elongated radially spaced slots 28 which are transversely disposed with respect to the track of the tread 20. Each of the slots 28 are provided with a pair of oppositely disposed spaced apertures 30 and 32 which extend through the tire casing 14 in communication with the interior of said tire.

A substantially U-shaped steel traction loop generally indicated at reference character 34 is secured to the tire adjacent to each slot or recess 28 in a manner that will be hereinafter set forth. The steel loop 34 comprises a pair of radially disposed spaced leg members 36 and 38 having the inner ends thereof secured to or vulcanized within the annular beads 22 and 24, respectively, of the tire casing. The upper ends of the leg members 36 and 38 extend through the apertures 30 and 32 in communication with the slot 28.

A cross bar 40 which constitutes the base portion of the U-shaped steel loop 34 is secured between the outer ends of the leg members 36 and 38 and is disposed within the slot or recess 28. The outer surface of the base member 40 is provided with a plurality of teeth members 42 which extend substantially the entire length of the base member 40. It is noted that the base member 40 and leg members 36 and 38 may be constructed from a single piece of material and substantially any suitable material may be used. However, it is felt that due to the expected harsh environment some sort of steel would be most desirable.

Each of the slots or recesses 28 around the entire circumference of the tire is provided with a U-shaped steel traction loop similar to that depicted and described by reference character 34.

Figure 2:
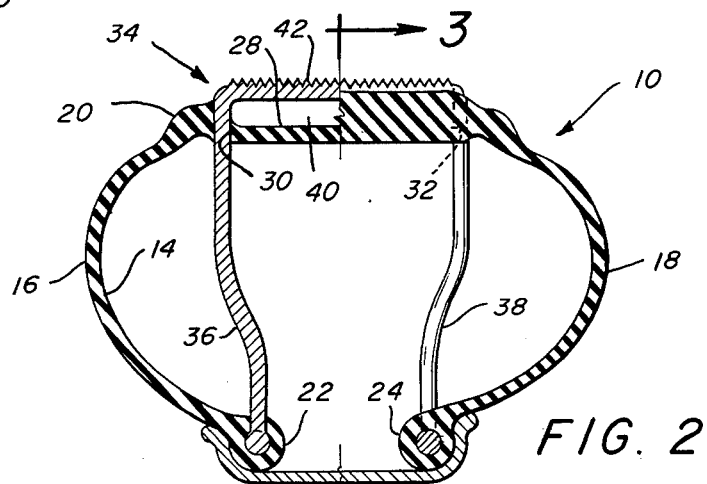
FIG. 2 is an elevational sectional view of the tire of FIG. 1 taken along the broken lines 2—2 of FIG. 1 and showing the tire partially deflated.

It will be noted that the tire as depicted by the cross sectional view of FIG. 2 is in a partially deflated condition thereby allowing the tread portion 20 of the said tire to be retracted or forced inwardly thereby exposing the teeth 42 of the steel loop 34 to extend beyond the tread surface 20 thereby contacting the road surface and biting into the ice or snow which may be present thereon.

Sealing means must be provided between the tire casing and tread portion and the upper end portions of the leg members 36 and 38 to provide a substantially airtight seal between the tire member and the said leg members. The tire at this point may be vulcanized to the leg members to provide a sufficient seal. The flexibility of the material around these leg members will allow the tread surface 20 to move in and out in accordance with the amount the tire is inflated while still retaining a grip on the upper portion of the said leg members 36 and 38.

Figure 4:
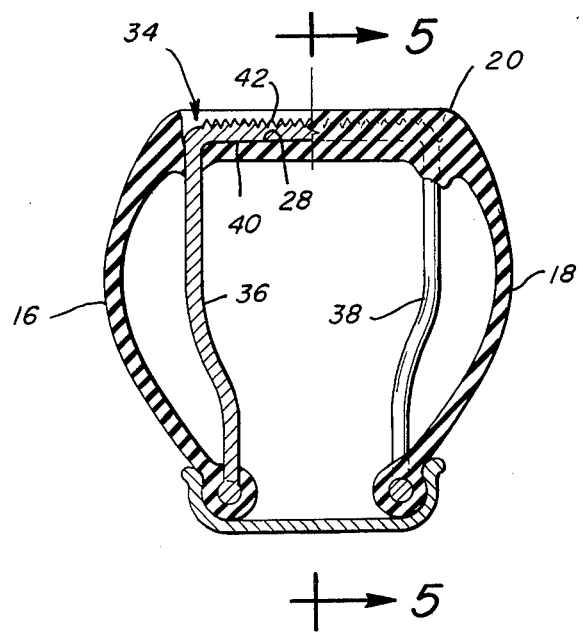
FIG. 4 is an elevational sectional view of the tire of FIG. 2, said tire being fully inflated.

When the roads are clear and normal driving conditions prevail, the tire as shown in FIG. 2 may then be inflated and will assume the cross-sectional shape as depicted in FIG. 4. When additional air is added to the interior of the tire, the cross-sectional shape of the casing 14 will tend to stiffen, thereby forcing the tread portion 20 thereof to extend or move outwardly away from the rim 12. Since the steel loop 34 is anchored to the bead members 22 and 24 of the tire, adjacent to the rim, the steel loop 34 will remain in the substantially same position as depicted in FIG. 2 or in the deflated position, but the tread surface 20 will move outwardly beyond the teeth members 42 thereby recessing the base member 40 and associated teeth members 42 within the slots or recesses 28, thereby exposing only the rubber tread surfaces of the tire to the pavement.

It is readily apparent that the shape of the base member 40 and associated teeth 42 thereon should conform to the cross-sectional shape of the tread pattern for the tire in which it is used. Stated another way, if the tread pattern for the tire has a cross-sectional shape which is rounded such as the case with radial tires, then the base member 40 and associated teeth members 42 should be shaped to conform to the cross-sectional design of the tread.

Figure 3:
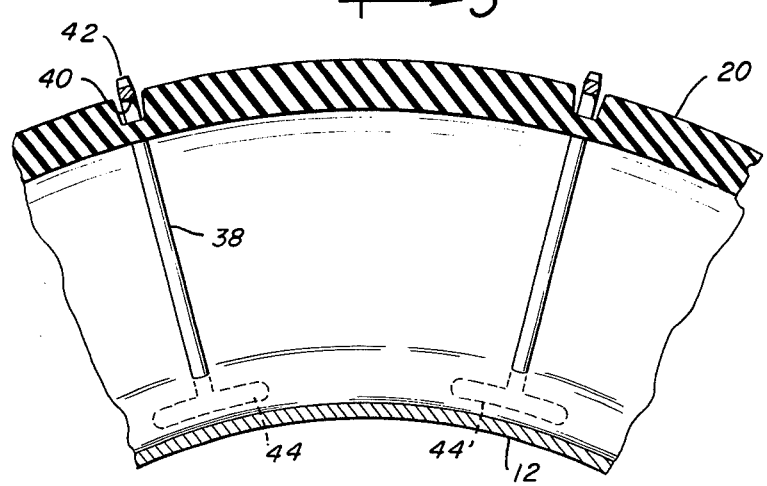
FIG. 3 is a side elevational sectional view of the tire of FIG. 2 taken along the broken lines 3—3 of FIG. 2.
Figure 5:
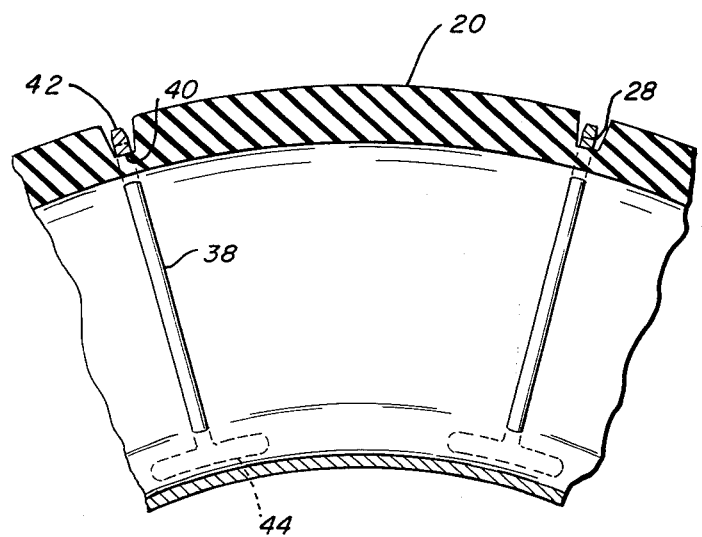
FIG. 5 is a side elevational sectional view of the tire of FIG. 4 taken along the broken lines 5—5 of FIG. 4.

In order to add longitudinal stability to the steel loop 34, longitudinal rods such as that depicted as reference character 44 in FIGS. 3 and 5 which may be vulcanized into the annular bead members 22 and 24 and welded to the ends of the leg members 36 and 38.

From the foregoing it is apparent that the present invention provides a snow tire which may be easily converted to ordinary clear road use by simply fully inflating said tire to extend the tread portion outwardly beyond the snow or ice gripping steel teeth members provided.

While in the drawings the base member 40 is shown to be straight it can be seen that it may be a curve, a zig-zig, or other irregular configuration. In addition, an advantage to the tire construction of this invention is that with the steel loops 34 placed close enough together they can support the tire in the event of the complete loss of air pressure thereby providing improved safety in case of blow out at high driving speeds and in addition provide means whereby the user could drive without air pressure a sufficient distance to reach a repair station.

Whereas, the present invention has been described in particular relation to the drawings attached hereto, it is readily apparent that other and further modifications, apart from those shown or suggested herein, may be made within the spirit and scope of this invention.

What is claimed is:

1. A snow tire comprising a casing mountable on a wheel rim and having tread portion on the outer surface of said casing, a plurality of spaced elongated recesses provided in said tread portion, a pair of oppositely disposed spaced apertures provided in each end of said recess and extending through the casing to the interior of the tire, a pair of oppositely disposed radially extending steel roads for each said recess, each said steel rod having one end thereof secured to the casing adjacent to the wheel rim and the other end of said rod extending through each of the apertures in communication with each recess, sealing means for providing an airtight seal between the tire casing and the outer end of said rods, elongated steel cross bar secured between the outer ends of the rods and radially reciprocally disposed within said recess, steel teeth provided along the outer edge of said cross bar whereby when the tire is fully inflated, the outer surface of the tread will extend outwardly beyond the steel teeth thereby causing said teeth to be recessed within the elongated recess and upon partial deflation of the tire, said teeth will protrude beyond the outer surface of the tread.

2. A snow tire as set forth in claim 1 wherein the elongated steel cross bar is shaped to conform to the cross-sectional shape of the tread.

3. A snow tire comprising:
   a tire casing mountable on a wheel rim, the casing having an outer tread portion, the tread portion having a plurality of spaced apart elongated recess therein;
   a metal traction means carried by said casing within each said tread portion recesses, the height of the traction means being less than the depth of said recesses;
   a rod affixed to each end of each of said traction means, the rods extending sealably through said tire casing and anchored at their inner ends to the portion of the tire casing adjacent the wheel rim engaging portion, the length of the rods being dimensioned such that when the tire is fully inflated the traction means are fully withdrawn in said recesses and when said tire is partially deflated, each said traction means extend partially exteriorly of said casing tread portion.

* * * * *